United States Patent
Frisch et al.

(10) Patent No.: US 6,252,660 B1
(45) Date of Patent: Jun. 26, 2001

(54) METHOD AND DEVICE FOR MEASURING THE LENGTH OF A LIGHT GUIDE

(75) Inventors: Ernst Georg Frisch, München; Walter Braumandl, Thurmansbang, both of (DE)

(73) Assignee: Sensor Instruments GmbH (DE)

( * ) Notice: Subject to any disclaimer, the term of this patent is extended or adjusted under 35 U.S.C. 154(b) by 0 days.

(21) Appl. No.: 09/419,750

(22) Filed: Oct. 16, 1999

(30) Foreign Application Priority Data

Oct. 15, 1998 (DE) ............................................... 198 47 617

(51) Int. Cl.[7] ............................. G01B 11/02; G01N 21/00
(52) U.S. Cl. .......................................... 356/383; 356/73.1
(58) Field of Search ................................... 356/383, 372, 356/73.1; 385/15, 12; 250/227.11, 227.12, 227.19, 227.23, 227.27

(56) References Cited

U.S. PATENT DOCUMENTS

| | | | |
|---|---|---|---|
| 4,176,954 | * | 12/1979 | Bouillie et al. .................... 356/73.1 |
| 5,534,994 | * | 7/1996 | Hanson et al. ..................... 356/73.1 |
| 5,541,730 | * | 7/1996 | Chaney ............................... 356/358 |
| 5,737,067 | * | 4/1998 | Sansone .............................. 356/383 |
| 6,011,615 | * | 1/2000 | Mamyshev et al. ................ 356/73.1 |

* cited by examiner

*Primary Examiner*—Hoa Q. Pham
(74) *Attorney, Agent, or Firm*—Robert W. Becker & Associates

(57) ABSTRACT

In a method for determining the length of a light guide light of two different wavelengths or wavelength ranges is passed through a light guide whose length is to be measured. The ratio of incident light intensity to exit light intensity for each one of the wavelengths or wavelength ranges of the light passing through the light guide is determined. The length of the light guide is calculated based on wavelength-dependent attenuation coefficients of the light guide and the ratios of incident light intensity to exit light intensity for each one of the wavelengths or wavelength ranges of the light. The device for determining the length of a specimen light guide has a light source emitting a light beam, a device for introducing the light beam emitted by the light source into a light window of the specimen light guide, a first measuring device for determining of ratio of incident light intensity of the light beam at the light window for two different wavelengths or two wavelength ranges, and a second measuring device for determining a ratio of exit light intensity for the two different wavelengths or the two different wavelength ranges of light exiting from the exit window of the specimen light guide.

14 Claims, 2 Drawing Sheets

METHOD AND DEVICE FOR MEASURING THE LENGTH OF A LIGHT GUIDE

BACKGROUND OF THE INVENTION

The present invention relates to a method and a device for measuring or determining the length of a light guide.

Light guides are increasingly used in communications technology for signal and data transmission. A growing field of application is the use of light guides in motor vehicles because they require less space than a conventional wire harness. The quality control of the light guides is usually carried out such that the attenuation of the light passing through the light guide is measured. This attenuation, however, only provides a reliable result with respect to the quality of the light guide when the length of the light guide is known. However, this length, when the light guide is already mounted in its proper location of use, can no longer be measured with simple measuring means.

It is therefore an object of the present invention to provide a method and a device for determining or measuring the length of a light guide in a simple manner.

SUMMARY OF THE INVENTION

The method of the invention for determining the length of a light guide is characterized by the steps of passing light of two different wavelengths or wavelength ranges through a light guide whose length is to be measured, determining a ratio of incident light intensity to exit light intensity for each one of the wavelengths or wavelength ranges passing through the light guide, calculating the length of the light guide based on wavelength-dependent attenuation coefficients of the light guide and the ratios of incident light intensity to exit light intensity for each one of the wavelengths or wavelength ranges of the light.

A further method of the invention for determining the length of a light guide is characterized by the steps of guiding a light, emitted by at least one light source and having two different wavelengths or wavelength ranges, into a reference light guide of a known length and into a specimen light guide whose length is to be determined, determining a ratio of exit light intensity of the reference light guide for the different wavelengths or the different wavelength ranges and a ratio of exit light intensity of the specimen light guide for the different wavelengths or the wavelength ranges, calculating a ratio of incident light intensity of the different wavelengths or the two different wavelength ranges for the reference light guide based on the ratio of exit light intensity of the reference light guide, the known length, and the attenuation coefficient of the reference light guide, and calculating the length of the specimen light guide based on the ratio of incident light intensity of the two different wavelengths or the two different wavelength ranges, the ratio of exit light intensity of the specimen light guide, and an attenuation coefficient of the specimen light guide.

The device of the invention for determining a length of a specimen light guide has a light source emitting a light beam, a device for introducing the light beam emitted by the light source into a light window of the specimen light guide, a first measuring device for determining a ratio of incident light intensity of the light beam at the light window for two different wavelengths or two different wavelength ranges, a second measuring device for determining a ratio of exit light intensity for the two different wavelengths or the two different wavelength ranges of light exiting from an exit window of the specimen light guide The invention takes advantage of the fact that the attenuation coefficient of a light guide essentially depends on the wavelength. When the attenuation for two different wavelengths or wavelength ranges is measured, it is possible to determine the length of the light guide from the measured results and the attenuation coefficient of the material of the light guide.

The methods and device present invention provide a simple and reliable quality control for a light guide.

BRIEF DESCRIPTION OF THE DRAWINGS

The object and the advantages of the present invention will appear more clearly from the following specification in conjunction with accompanying drawings, in which.

DESCRIPTION OF PREFERRED EMBODIMENTS

The present invention will now be described in detail with the aid of several specific embodiments utilizing FIGS. 1–4.

Figure 1:
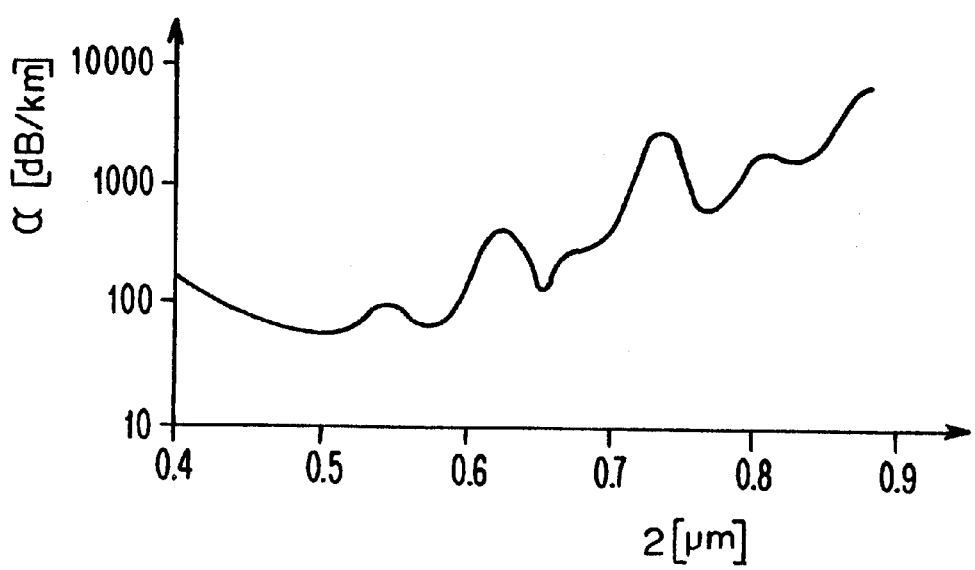
FIG. 1 shows the attenuation coefficient as a function of the wavelength for a light guide.

FIG. 1 shows the wavelength dependency of the attenuation coefficient $\alpha$ for a light guide consisting completely of plastic material and having a core of plexiglass. The attenuation that is imparted to the light guided through a light guide is caused by Rayleigh scattering and for POF light guides (POF=polymer-optical fibers; core made of plexiglass; sheath made of fluoresced polymer) or light guide fibers is caused by CH absorption. As can be seen in FIG. 1, the attenuation increases with increasing wavelength, i.e., it is greater in the red spectrum than in the blue spectrum of visible light.

Figure 2:
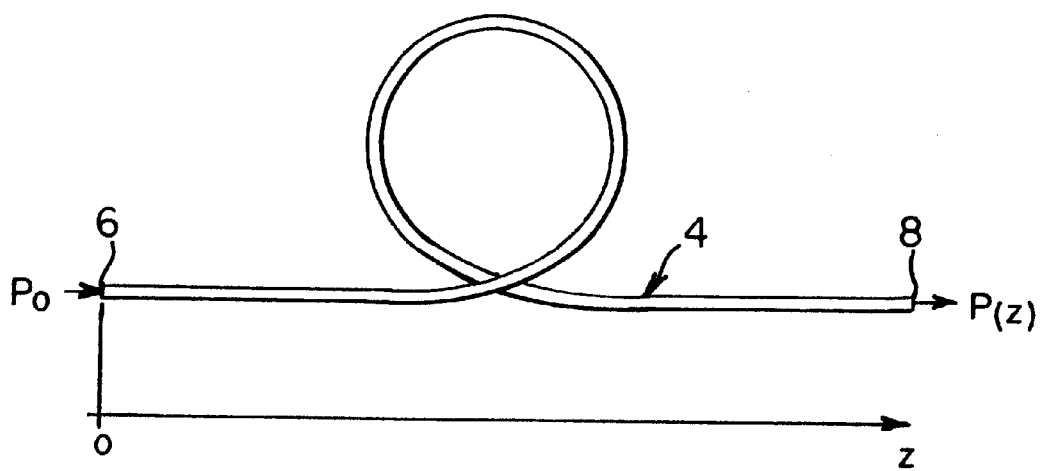
FIG. 2 shows a schematic arrangement for illustrating the physical relationships.

FIG. 2 shows a schematic arrangement for providing certain definitions.

The letter z indicates the length of a light guide 4. $P_0$ is the optical output or intensity which impinges on the inlet window 6 of the light guide 4 at z=0. P(z) is the output or light intensity of the light beam exiting the light guide after passing through the length z of the light guide through the exit window 8. The following equation applies:

$$P(z) = P_0 \cdot 10^{\frac{-\alpha_\lambda \cdot z}{10\,dB}} \quad (1)$$

whereby $\alpha_\lambda$ is the wavelength-dependent coefficient.

For two different wavelengths $\lambda 1$ and $\lambda 2$ the following equations apply:

$$P_{\lambda 1}(z) = P_{0\lambda 1} \cdot 10^{\frac{-\alpha_{\lambda 1} \cdot z}{10\,dB}} \quad (2)$$

$$P_{\lambda 2}(z) = P_{0\lambda 2} \cdot 10^{\frac{-\alpha_{\lambda 2} \cdot z}{10\,dB}} \quad (3)$$

Based on the two equations 2 and 3 the length can be determined as follows:

$$z = \frac{10 \text{ dB}}{\alpha_{\lambda 2} - \alpha_{\lambda 1}} \lg\left(\frac{P_{\lambda 1}(z) \cdot P_{0\lambda 2}}{P_{\lambda 2}(z) \cdot P_{0\lambda 1}}\right) \quad (4)$$

When the attenuation coefficients $\alpha_{\lambda 1}$ and $\alpha_{\lambda 2}$ are known (they depend on the material of the light guide) and the incident light intensities $P_{0\lambda 1}$ and $P_{0\lambda 2}$ as well as the exit light intensities $P_{\lambda 1}(z)$ and $P_{\lambda 2}(z)$ are known or are measured, the length z of the light guide can be calculated based on the equation (4). It is understood that in the aforementioned equations instead of a discrete wavelength $\lambda 1$ and $\lambda 2$ wavelength ranges can be used, for example, a blue wavelength spectrum extending from 430 nm to 600 nm and a red wavelength spectrum of 600 nm to 700 nm. For a conventional POF light guide the attenuation coefficient is then $\alpha_{blue}$ approximate=0.09 dB/m and $\alpha_{red}$ approximate=0.02 dB/m.

Figure 3:
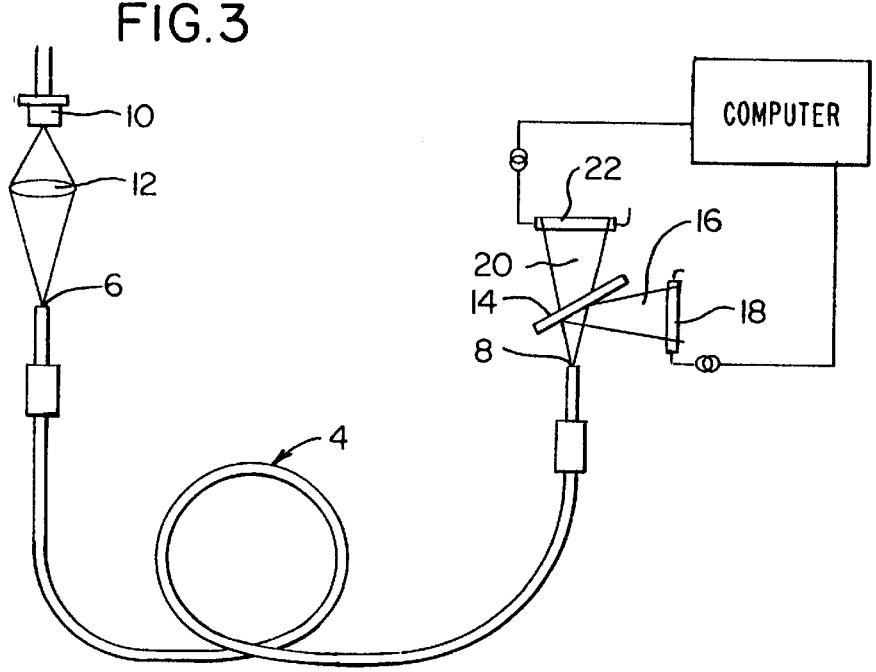
FIG. 3 shows a schematic arrangement for attenuation measurement for different wavelengths.

FIG. 3 shows a measuring arrangement for measuring the attenuation for two different wavelength ranges.

As a light source 10 a white light LED is used which via lens 12 emits a light beam that is projected via lens 12 onto the inlet window 6 of the light guide. The light exiting from the exit window 8 of the light guide impinges on a dichroic mirror 14 having a reflection behavior that depends on the wavelength. In the shown embodiment, the dichroic mirror 14 is a red light mirror, having reflection properties that increase suddenly at approximately 600 nm so that a red light beam 16 is reflected onto the light detector 18 and a blue light beam 20 passes through the dichroic mirror 14 onto the light detector 22.

When the wavelength-dependent attenuation coefficient $\alpha_\lambda$ of the light guide 4 is known and the wavelength-dependent incident light intensities $P_{0\lambda}$ are known, it is possible to determine the length of the light guide based on the measurement of the intensity of the two light beams 16 and 20 via the equations (2) and (3), respectively, the equation (4). If necessary, the result can be corrected for the effect of the dichroic mirror 14 if it does not completely deflect the red light beam onto the light detector 18 and does not completely deflect the blue light beam onto the light detector 22.

Figure 4:
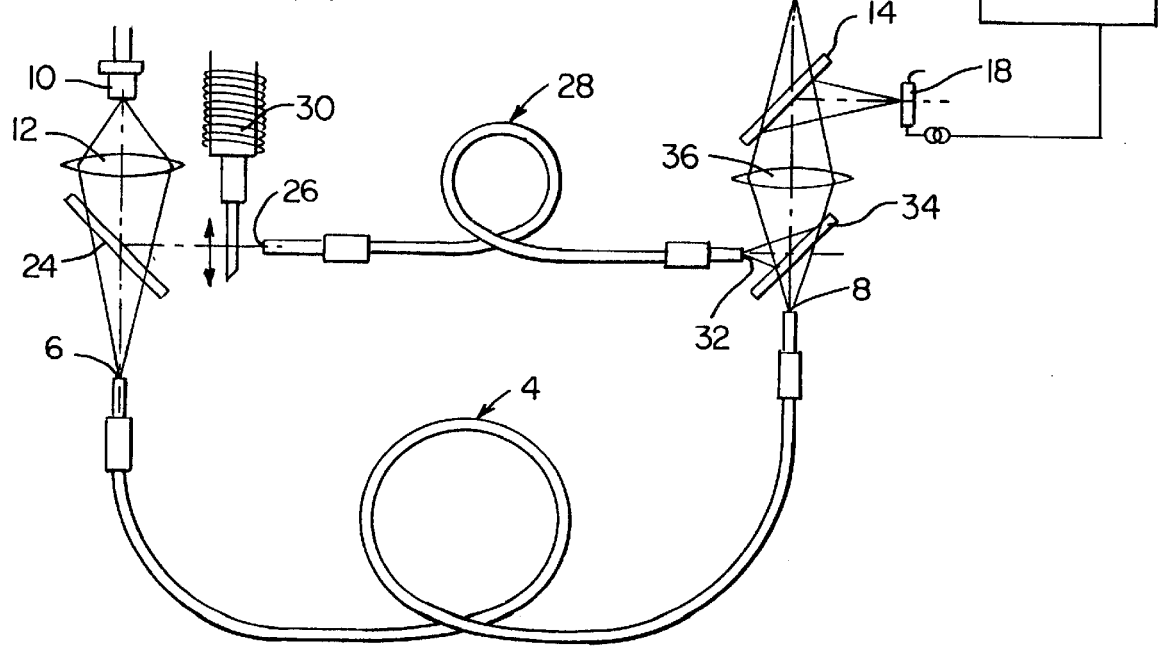
FIG. 4 shows a device based on FIG. 3 that is further developed for measuring the length of the light guide.

In general, it is difficult to measure the wavelength-dependent incident light intensity $P_{0\lambda}$. FIG. 4 shows a measuring arrangement which is a further development of the device of FIG. 3 and which allows determination of the length of the light guide 4 without measuring the incident light intensity.

In the arrangement of FIG. 4 the following components are provided in addition to the device of FIG. 3.

Between the lens 12 and the inlet window 6 of the light guide 4 a semi-transparent mirror is provided as a beam divider 24 which allows a portion of the light beam emitted by the light source 10 to enter the inlet window 26 of a reference light guide 28. Between the inlet window 26 and the beam divider 24 a shutter 30 is provided.

The light exiting from the exit window 32 of the reference light guide 28 impinges on the semi-transparent mirror and is then focused by the lens 36 depending on the wavelength range onto one of the light detectors 18 and 22 embodied as a photodiode. The exit window 8 is also projected by the lens 36 onto the light detectors 18 and 22.

The measuring arrangement functions as follows.

While no specimen light guide 4 has yet been mounted, the shutter 30 is opened so that the outlet window of the light source 10 is projected via the lens 12 and the beam divider 24 onto the inlet window 26 of the reference light guide 28. The reference light guide 28 corresponds with respect to its material and cross-sectional dimensions to the light guide 4 whose length is to be measured. The intensity of the light exiting the reference light guide 28 is measured by the light detectors 18 and 22 so that based on equation (4) in which the length z of the reference light guide 28, the wavelength-dependent attenuation coefficients $\alpha_{\lambda 1}$ and $\alpha_{\lambda 2}$ as well as the ratio $P_{\lambda 1}(z)$ and $P_{\lambda 2}(z)$ measured via the light intensities by the light detectors 18 and 22 are known, the ratio of the incident light intensities $P_{0\lambda 1}$ to $P_{0\lambda 2}$ can be calculated.

After completion of measurement of $P_{\lambda 1}(z)$ and $P_{\lambda 2}(z)$ for the reference light guide 28, the shutter 30 is closed and the specimen light guide 4 of unknown length is mounted in the measuring device, or, if the light guide 4 is already mounted at its location of use, the arrangement with the components 10, 12 and 24, on the one hand, and the components 34, 36, 14, 18 and 22, on the other hand, are mounted at the specimen light guide 4 to be measured such that the light beam emitted by the light source 10 is projected onto the inlet window 6 and the light beam exiting from the exit window 8 is projected onto the detectors 18 and 22. The arrangement operates as if the reference light guide 28 was not present. Subsequently, the intensities of the light beams impinging onto the light detectors 18 and 22 are measured so that in the equation (4) the ratio $P_{\lambda 1}(z)$ to $P_{\lambda 2}(x)$ is known. At the right side of the equation (4) all parameters are then known based on the previous measurement at the reference light guide 28 and the recent measurement at the light guide 4 so that the length z of the light guide 4 can be determined. It is understood that possible frequency-dependent effects of the beam divider 24 and of the semi-transparent mirror 34 should be corrected.

In summarizing the above, with the measuring arrangement of FIG. 4 it is possible to determine the length of the light guide 4. When additionally the attenuation, i.e., the ratio of incident light intensity of the light entering the light guide 4 to the exit light intensity of the light exiting the light guide 4, can be measured, for example only for the spectral range for which the light guide 4 is to be used, and when the length of the light guide 4 is known, quality assurance of the light guide 4 is possible. Attenuation can be measured according to methods known in the art or can be measured in that the intensities measured by the light detectors 18 and/or 22 upon passing of a light beam through the light guide 4 can be compared to the intensities measured for the reference light guide 28. Based on equation (1), the attenuation of the light guide 4 can then be calculated, i.e., the ratio of $P_{0\lambda}$ to $P_\lambda(z)$ can be determined.

It is understood that the calculations can be carried out by a computer system that is connected to the light detectors 18 and 22.

The arrangement of FIG. 4 can be varied in multiple ways. For example, a further shutter can be arranged between the inlet window 6 and the beam divider 24. The beam divider 24 and the semi-transparent mirror 34 can be eliminated when the reference light guide 28 is mounted in the arrangement instead of the light guide 4. The dichroic mirror 14 can be replaced with other optical components with wavelength-dependent light deflection, for example, prisms. When the component 14 is eliminated, it is possible to work with only one light detector having optical filters arranged downstream thereof. The measurement for determining the length can be performed with more than two different wavelengths. LEDs having different wavelengths or a laser, white light sources etc. can be employed as a light source.

The specification incorporates by reference the disclosure of German priority document 198 47 617.5 of October 15, 1998.

The present invention is, of course, in no way restricted to the specific disclosure of the specification and drawings, but also encompasses any modifications within the scope of the appended claims.

What is claimed is:

1. A method for determining a length of a light guide, said method comprising the steps of:

passing light of two different wavelengths or wavelength ranges through a light guide whose length is to be measured;

determining a ratio of incident light intensity to exit light intensity for each one of said wavelengths or wavelength ranges of said light passing through said light guide;

calculating said length of said light guide based on wavelength-dependent attenuation coefficients of said light guide and said ratios of incident light intensity to exit light intensity for each one of said wavelengths or wavelength ranges of said light.

2. A method according to claim 1, wherein in said step of calculating the following equation is used:

$$z = \frac{10 \text{ dB}}{\alpha_{\lambda 2} - \alpha_{\lambda 1}} \lg\left(\frac{P_{\lambda 1}(z) \cdot P_{0\lambda 2}}{P_{\lambda 2}(z) \cdot P_{0\lambda 1}}\right)$$

wherein z=length of said light guide; $\alpha_{\lambda 1}$=attenuation coefficient of wavelength or wavelength range $\lambda 1$; $\alpha_{\lambda 2}$=attenuation coefficient of wavelength or wavelength range $\lambda 2$; $P_{\lambda 1}(z)$=exit light intensity of $\lambda 1$; $P_{0\lambda 2}$=incident light intensity of $\lambda 2$; $P_{\lambda 2}(z)$=exit light intensity of $\lambda 1$; $P_{0\lambda 1}$=incident light intensity of $\lambda 1$.

3. A method according to claim 1, further comprising the step of measuring the attenuation of said light guide with light of a predetermined wavelength after said step of calculating.

4. A method for determining a length of a light guide, said method comprising the steps of:

guiding a light, emitted by at least one light source and having two different wavelengths or wavelength ranges, into a reference light guide of a known length and into a specimen light guide whose length is to be determined;

determining a ratio of exit light intensity of said reference light guide for said different wavelengths or said different wavelength ranges and a ratio of exit light intensity of said specimen light guide for said different wavelengths or said wavelength ranges;

calculating a ratio of incident light intensity of said two different wave lengths or said two different wavelength ranges for said reference light guide based on said ratio of exit light intensity of said reference light guide, said known length, and an attenuation coefficient of said reference light guide;

calculating said length of said specimen light guide based on said ratio of incident light intensity of said two different wavelengths or said two different wavelength ranges, said ratio of exit light intensity of said specimen light guide, and an attenuation coefficient of said specimen light guide.

5. A method according to claim 4, wherein in said step of calculating the following equation is used:

$$z = \frac{10 \text{ dB}}{\alpha_{\lambda 2} - \alpha_{\lambda 1}} \lg\left(\frac{P_{\lambda 1}(z) \cdot P_{0\lambda 2}}{P_{\lambda 2}(z) \cdot P_{0\lambda 1}}\right)$$

wherein z=length of said light guide; $\alpha_{\lambda 1}$=attenuation coefficient of wavelength or wavelength range $\lambda 1$; $\alpha_{\lambda 2}$=attenuation coefficient of wavelength or wavelength range $\lambda 2$; $P_{\lambda 1}(z)$=exit light intensity of $\lambda 1$; $P_{0\lambda 2}$=incident light intensity of $\lambda 2$; $P_{\lambda 2}(z)$=exit light intensity of $\lambda 1$; $P_{0\lambda 1}$=incident light intensity of $\lambda 1$.

6. A method according to claim 4, further comprising the step of determining the attenuation of said light guide after said length is determined with light of a predetermined wavelength.

7. A device for determining a length of a specimen light guide, said device comprising:

a light source emitting a light beam;

a device for introducing said light beam emitted by said light source into a light window of the specimen light guide;

a first measuring device for determining a ratio of incident light intensity of said light beam at the light window for two different wavelengths or two different wavelength ranges;

a second measuring device for determining a ratio of exit light intensity for the two different wavelengths or the two different wavelength ranges of light exiting from an exit window of the specimen light guide;

a computer for calculating said length of said specimen light guide based on the results of said first and second measuring devices.

8. A device according to claim 7, wherein said second measuring device comprises an optical component and multiple light detectors, wherein said optical component deflects said exit light exiting from the exit window onto said light detectors.

9. A device according to claim 7, wherein said first measuring device comprises:

a reference light guide having a light window and an exit window;

a beam divider dividing said light beam of said light source into a first and second beam, wherein said first beam is directed onto the light window of the specimen light guide and said second beam is directed onto said light window of said reference light guide;

a measuring unit for determining a wavelength-dependent light intensity of light exiting through said exit window of said reference light guide.

10. A device according to claim 9, wherein said computer is connected to said measuring unit for calculating parameters of the specimen light guide based on the following equation:

$$z = \frac{10 \text{ dB}}{a_{l2} - a_{l1}} \lg \frac{P_{l1}(z) \times P_{0l2}}{(P_{l2}(z) \times P_{0l1})}$$

wherein z=length of said light guide; $a_{l1}$=attenuation coefficient of wavelength or wavelength range I1; $a_{l2}$=attenuation coefficient of wavelength or wavelength range I2; $P_{l1}(z)$=exit light intensity of I1; $P_{0l2}$=incident light intensity of I2; $P_{l2}(z)$=exit light intensity of I1; $P_{0l1}$=incident light intensity of I1.

11. A device according to claim 9, wherein said reference light guide has a known length and wherein said reference light guide has properties similar to properties of the specimen light guide.

12. A device according to claim 9, wherein said beam divider is a semitransparent mirror.

13. A device according to claim 9, wherein said first measuring device further comprises a semitransparent mirror for guiding said light exiting through said exit window of said reference light guide and said light exiting from the exit window of the specimen light guide onto said measuring unit.

14. A device according to claim 9, further comprising at least one shutter for interrupting said first light beam or said second light beam.

* * * * *

UNITED STATES PATENT AND TRADEMARK OFFICE
CERTIFICATE OF CORRECTION

PATENT NO. : 6,252,660 B1
DATED : June 26, 2001
INVENTOR(S) : Frisch et al.

It is certified that error appears in the above-identified patent and that said Letters Patent is hereby corrected as shown below:

<u>Title page,</u>
Item [22], should read as follows: -- [22] Filed: October 15, 1999 --

Signed and Sealed this

Second Day of July, 2002

Attest:

Attesting Officer

JAMES E. ROGAN
*Director of the United States Patent and Trademark Office*